Patented Dec. 12, 1950

2,533,243

UNITED STATES PATENT OFFICE 2,533,243

2[2-N-BENZYL-N-(β-CHLOROETHYL) AMINOETHYL] PYRIDINE AND THE ACID SALTS THEREOF

William S. Gump, Upper Montclair, and Edward Joseph Nikawitz, Passaic, N. J., assignors to The Givaudan Corporation, New York, N. Y., a corporation of New Jersey No Drawing. Application October 29, 1949,
Serial No. 124,482

1 Claim. (Cl. 260—296)

This invention relates to novel aromatic haloamines and salts thereof.

Our novel chemicals include 2-[2-N-benzyl-N-(β-chloroethyl) aminoethyl] pyridine, and salts thereof with acids.

In general, the novel salts of this invention may be prepared by reacting an equivalent amount of inorganic or organic acids with the corresponding amines, preferably in some cases under anhydrous or substantially anhydrous conditions. The amines may be prepared by reacting the corresponding hydrohalides with at least an equivalent amount of alkaline material, such as, for example potassium carbonate. The hydrohalides may be prepared in general by reacting the beta-alcohols of the amines with thionyl chloride or hydrogen bromide.

The new salts of this invention are crystalline solids under usual atmospheric conditions and in general are soluble in alcohols and glycols, difficultly soluble in water and insoluble in ether and hydrocarbons. The new amines are in general high boiling liquids, varying in color from water-white to yellow. They are not soluble in water, but dissolve in ethyl alcohol, propylene glycol, and organic solvents generally.

Our novel chemical compounds exhibit unexpected and desirable medicinal properties, for example, as sympatholytic and adrenolytic agents. For therapeutic purposes these novel compounds may be administered orally or parenterally, and may be employed as tablets or in capsules or in solutions. In addition to their therapeutic properties our novel compounds are useful in organic chemical synthesis.

While our invention comprehends salts of the amines set forth above and acids in general, we prefer to employ those acids having an ionization constant of at least about $1 \times 10^{-2}$ at normal room temperature (about 25° C.). Examples of some suitable organic acids are picric, trichloroacetic, oxalic and maleic acids. Examples of some suitable inorganic acids are hydrochloric, hydrobromic, sulfuric, phosphoric (first hydrogen), perchloric, nitric and iodic acids.

In order to illustrate this invention more fully but without thereby limiting it, the following examples are given.

EXAMPLE 1

PREPARATION OF 2-[2-N-BENZYL-N-(β-CHLOROETHYL) AMINOETHYL] PYRIDINE DIHYDROCHLORIDE (a) *Preparation of 2-(2-chloroethyl) pyridine hydrochloride*

A solution of 360 g. of thionyl chloride in 300 cc. of chloroform was dropped during 3 hours into a mixture of 360 g. of 2-(2-hydroxyethyl)-pyridine in 200 cc. of chloroform being stirred and cooled in an ice-bath. Stirring was then continued for 6 hours; next morning, the chloroform was distilled off. The resinous residue was dried for one hour in vacuo (4 mm.) at 80° C. Repeated trituration of the resin with petroleum ether yielded a solid which was recrystallized from isopropanol in the presence of decolorizing carbon. Slightly brownish, very hygroscopic crystals (210 g.) which melted at about 120° C. were obtained.

Anal. Calcd. for $C_7H_9NCl_2$: Cl-, 20.0; total Cl, 39.9.
Found: Cl-, 20.5; total Cl, 39.6.

(b) *2-[2-N-benzyl-N-(β-hydroxethyl) aminoethyl] pyridine*

Sixty g. of 2-(2-chloroethyl)-pyridine hydrochloride were added during 25 minutes to 150 g. of 2-benzylaminoethanol being stirred and heated to 100° C. The mixture was then heated to 110° C. for 6 hours. After cooling to room temperature a solution of 40 g. of sodium hydroxide in 200 cc. of water was added and the formed amino alcohol extracted with 200 cc. of benzene. The benzene solution was washed with 300 cc. of water and dried with anhydrous sodium sulfate. A brown oil resulted after filtration from the salt and removal of the solvent. 38 g. of the desired amino alcohol were obtained as slightly yellow oil by vacuum distillation; B. P. (5 mm.) 198–202° C.; $n^D_{20}=1.5600$.

Anal. Calcd. for $C_{16}H_{20}N_2O$: C, 75.0; H, 7.8; N, 10.9.
Found: C, 74.4; H, 7.4; N, 10.7.

(c) *2-[2-N-benzyl-N-(β-chloroethyl) aminoethyl] pyridine dihydrochloride*

Twenty-five g. of thionyl chloride dissolved in 100 cc. of chloroform were dropped during two hours into a solution of 33 g. of the amino alcohol (b) in 100 cc. of chloroform being stirred and cooled in an ice-bath. Stirring was continued for 5 hours at 10° C. and for 12 hours at room temperature. The solvent was then removed by distillation at diminished pressure; 20 cc. of absolute alcohol were added to the residue and distilled off in vacuo. A solid was formed which was refluxed with 100 cc. of absolute alcohol in the presence of a small amount of decolorizing carbon. The filtered solution was mixed with 15 cc. of a saturated solution of hydrogen chloride in alcohol and 200 cc. of ether. Crystallization in the refrigerator yielded smeary crystals which became well-defined after trituration with absolute ether. Three recrystallizations from absolute alcohol and ether (150–200 cc. of each solvent) yielded 10 g. of the desired substance in form of slightly brownish crystals; M. P. 171–172°.

Anal. Calcd. for $C_{16}H_{21}N_2Cl_3$: Cl, 20.4; total Cl⁻, 20.4; total Cl, 30.6.
Found: Cl⁻, 20.3; total Cl, 30.5.

The foregoing illustrates the practice of this invention, which however, is not to be limited thereby but is to be construed as broadly as permissible in view of the prior art and limited solely by the appended claim.

We claim:

2-[2-N-benzyl-N-($\beta$-chloroethyl)aminoethyl] pyridine dihydrochloride.

WILLIAM S. GUMP.
EDWARD JOSEPH NIKAWITZ.

No references cited.

Certificate of Correction

Patent No. 2,533,243 December 12, 1950

WILLIAM S. GUMP ET AL.

It is hereby certified that error appears in the printed specification of the above numbered patent requiring correction as follows:

Column 2, line 1, for "360 g." read *369 g.*; column 3, lines 6 and 7, for "Cl, 20.4; total Cl-, 20.4; total Cl, 30.6" read *Cl-, 20.4; total Cl 30.6*; and that the said Letters Patent should be read as corrected above, so that the same may conform to the record of the case in the Patent Office.

Signed and sealed this 13th day of February, A. D. 1951.

[SEAL]

THOMAS F. MURPHY,
*Assistant Commissioner of Patents.*